United States Patent
Ehlgen et al.

(10) Patent No.: US 9,260,052 B2
(45) Date of Patent: Feb. 16, 2016

(54) METHOD AND DEVICE FOR CONTROLLING A HEADLIGHT SYSTEM OF A VEHICLE

(75) Inventors: Tobias Ehlgen, Ravensburg (DE); Sebastian Van Staa, Leonberg (DE)

(73) Assignee: ROBERT BOSCH GMBH, Stuttgart (DE)

(*) Notice: Subject to any disclaimer, the term of this patent is extended or adjusted under 35 U.S.C. 154(b) by 186 days.

(21) Appl. No.: 14/114,176

(22) PCT Filed: Apr. 20, 2012

(86) PCT No.: PCT/EP2012/057304
§ 371 (c)(1),
(2), (4) Date: Jan. 8, 2014

(87) PCT Pub. No.: WO2012/146545
PCT Pub. Date: Nov. 1, 2012

(65) Prior Publication Data
US 2014/0125227 A1    May 8, 2014

(30) Foreign Application Priority Data
Apr. 28, 2011   (DE) .......... 10 2011 017 644

(51) Int. Cl.
*B60Q 1/02* (2006.01)
*H01K 7/00* (2006.01)
*B60Q 1/14* (2006.01)
*G06T 7/40* (2006.01)
*B60Q 1/00* (2006.01)

(52) U.S. Cl.
CPC .......... *B60Q 1/1423* (2013.01); *B60Q 1/0023* (2013.01); *B60Q 1/143* (2013.01); *G06T 7/403* (2013.01); *G06T 7/408* (2013.01); *B60Q 2300/312* (2013.01); *G06T 2207/10016* (2013.01); *G06T 2207/10024* (2013.01); *G06T 2207/30192* (2013.01); *G06T 2207/30252* (2013.01)

(58) Field of Classification Search
USPC ........................................ 315/76–84
See application file for complete search history.

(56) References Cited

U.S. PATENT DOCUMENTS

| | | | |
|---|---|---|---|
| 6,320,176 B1 | 11/2001 | Schofield et al. | |
| 8,786,697 B2* | 7/2014 | Kawasaki | 348/135 |
| 2008/0110556 A1 | 5/2008 | Kawasaki | |
| 2008/0169912 A1* | 7/2008 | Kawasaki | 340/425.5 |
| 2008/0239076 A1 | 10/2008 | Luo | |
| 2010/0157614 A1 | 6/2010 | Hue et al. | |
| 2011/0211246 A1* | 9/2011 | Agrawal et al. | 359/267 |
| 2011/0267673 A1* | 11/2011 | Agrawal et al. | 359/267 |
| 2013/0057687 A1* | 3/2013 | Ehlgen et al. | 348/148 |

FOREIGN PATENT DOCUMENTS

DE    102004041429    3/2006

OTHER PUBLICATIONS

International Search Report for PCT/EP2012/057304, issued on Jul. 20, 2012.

* cited by examiner

*Primary Examiner* — Brandon S Cole
(74) *Attorney, Agent, or Firm* — Kenyon & Kenyon LLP

(57) ABSTRACT

A method is described for controlling a headlight system of a vehicle. The method includes a step of reading in an aerosol signal which represents a recognized intensity of an aerosol in a field of vision of a camera of the vehicle. Furthermore, the method includes a step of activating a change in a light emission in a lighting area ahead of the vehicle with the aid of the headlight system as a response to the aerosol signal.

20 Claims, 3 Drawing Sheets

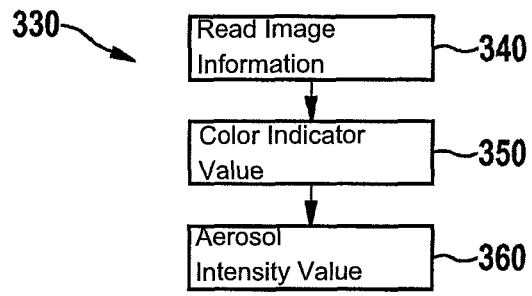
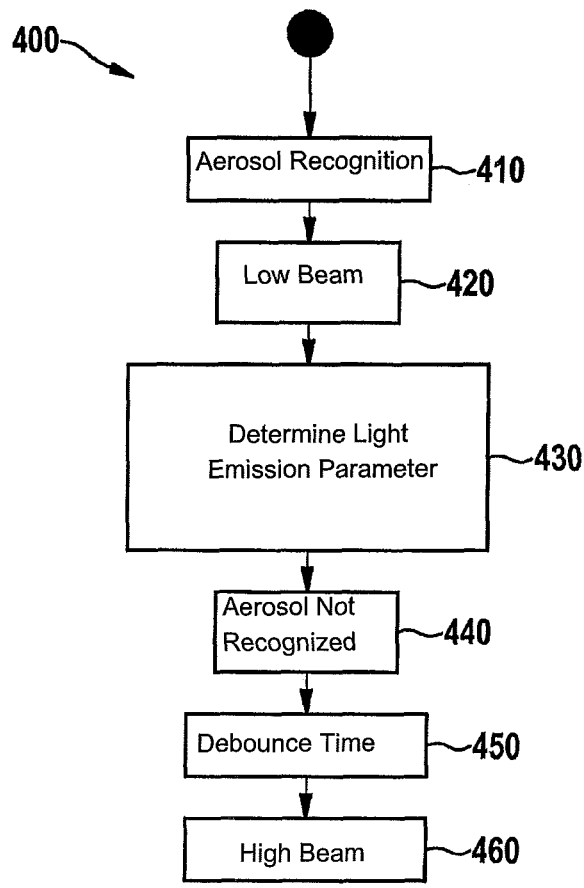

METHOD AND DEVICE FOR CONTROLLING A HEADLIGHT SYSTEM OF A VEHICLE

FIELD OF THE INVENTION

The present invention relates to a method for controlling a headlight system of a vehicle, to a corresponding device, as well as to a corresponding computer program product.

BACKGROUND INFORMATION

Conventional driver assistance systems often offer little or very insufficient recognition of meteorological phenomena during a drive of the vehicle, such as the occurrence of fog or smoke ahead of the vehicle. In particular during the night or when it is dark, when headlights are turned on during the drive of the vehicle, this may result in dangerous driving situations, e.g., when the lighting is set too high when driving into a fog bank and thus the driver is blinded by the strong reflection of the light from the aerosol droplets which form the fog.

SUMMARY

Against this background, a method for controlling a headlight system of a vehicle, furthermore a device which uses this method, as well as ultimately a corresponding computer program product are presented by the present invention.

The present invention provides a method for controlling a headlight system of a vehicle.

This method involves reading in an aerosol signal which represents a recognized intensity of an aerosol in a field of vision of a camera of the vehicle; and activating a change in light emission in a lighting area ahead of the vehicle with the aid of the headlight system as a response to the aerosol signal.

The present invention furthermore provides a device for controlling a headlight system of a vehicle. This device includes an interface for reading in an aerosol signal which represents a recognized intensity of an aerosol in a field of vision of a camera of the vehicle; and a unit for activating a change in light emission in a lighting area ahead of the vehicle with the aid of the headlight system as a response to the aerosol signal.

Thus, the present invention provides a device which is designed to carry out or implement the steps of the method according to the present invention in appropriate devices. This embodiment variant of the present invention in the form of a device also makes it possible to achieve the object underlying the present invention rapidly and efficiently.

In the present case, a device may be understood to mean an electrical device which processes sensor signals and outputs control signals as a function thereof. The device may have an interface which may be designed as hard- and/or software. In the case of a hardware design, the interfaces may, for example, be a part of a so-called system ASIC, which includes various functions of the device. It is, however, also possible that the interfaces are independent, integrated circuits or are at least partially made of discrete components. In the case of a software design, the interfaces may be software modules which are present on a microcontroller in addition to other software modules, for example.

A computer program product having program code is also advantageous, which may be stored on a machine-readable carrier, such as a semiconductor memory, a hard disk memory, or an optical memory, and is used for carrying out the method according to one of the specific embodiments described above, when the program is executed on a computer or a device.

A camera may in this case be understood to mean an optical detection device for visually detecting the vehicle's surroundings in a visual range of the camera. An aerosol may, for example, be understood to mean a mixture of liquid and solid particles in a gas, e.g., fog, vapor, or smoke, which occurs in the air in the field of vision of the camera of the vehicle. An intensity of an aerosol may, for example, be understood to mean a quantity of droplets or particles which seems to be present in the field of vision of the camera of the vehicle. A change may in this case be understood to mean not only the light emission per se, but also a change in parameters for controlling the light emission, such as a change in the switchover time between high-beam and low-beam or a change in the direction of a light emission in a system of a gliding illumination range regulation. The change in the light emission thus relates to a general change or parameter setting in the case of controlling the lighting of the vehicle with the aid of the headlight system.

The present invention is based on the recognition that a particularly good support of a driver may be achieved by enabling automatic activation of the light emission as a function of a recognized aerosol in a visual range of a camera of the vehicle. In this way, a driver of the vehicle may be relieved from manually switching over the light emission, in particular when it is recognized that a density of the aerosol has exceeded a predetermined threshold, so that there is the risk of the driver being blinded in the case of an incorrectly set light emission.

The present invention offers the advantage of directly supporting the driver upon the occurrence of aerosol in the field of vision of the camera of the vehicle, for example, by immediately lowering the direction of the light emitted by the headlights toward the direction of the roadway in order to prevent a driver from being blinded. If the driver knows that starting from a certain intensity of the aerosol in the air ahead of the vehicle, the driver assistance system automatically intervenes and accordingly adapts the light emission, it is possible to drive with an optimal lighting of the vehicle even in the case of low intensity and of the aerosol in the visual range of the camera of the vehicle.

According to another specific embodiment of the present invention, a change in a light emission parameter may be determined in the step of activating as a function of the time of presence of the aerosol, in particular the presence of a predetermined intensity of the aerosol. A light emission parameter may, for example, be understood to mean a debouncing time (i.e., a time until the start of an increase in the illumination range), a speed or a progression at which the illumination range is increased, an illumination height up to which the headlights emit the maximum amount of light, or a similar parameter which may be set by or in a lighting system of the vehicle. Such a specific embodiment of the present invention offers the advantage that a very flexible device for controlling the illumination range as a function of a time is possible, during which a certain intensity of an aerosol is present. For example, when driving through a foggy stretch, it may be recognized that the fog is very dense or that a long path is to be traveled through the fog having a certain minimum density so that it is very likely that after a recognized falling below an intensity of the fog, a fog bank will be traveled through again in a short period of time. In this situation, it may be very helpful to first wait a longer period of time (i.e., a longer debouncing time) before changing the light emission by the lighting device, in case another fog bank having the high intensity will indeed be traveled through, thus resulting again in the high-beam lights being switched over to low-beam or another change in the light emission to the previous illumination state.

It is furthermore advantageous when, according to another specific embodiment of the present invention, a change in the light distribution is activated in the step of activating in the case of an active light emission control as a function of the recognized intensity of the aerosol. Such a specific embodiment of the present invention enables a very flexible device or a very flexible method for controlling the illumination range as a function of the intensity of the aerosol, e.g., fog. In this way, the illumination range may, for example, be set as a function of the actually recognized intensity of the aerosol.

According to another specific embodiment of the present invention, a change in a light emission parameter for a light output by the headlight system of the vehicle may be activated between different lighting states in the step of activating. Such a specific embodiment of the present invention offers the advantage that, for example, the switchover of the headlight system between different lighting states (e.g., low-beam or high-beam) is very easily possible. For example, that lighting state which is suitable for the particular situation may be selected from predefined illumination states. Furthermore, such a specific embodiment of the present invention offers the advantage that during a drive through the fog, for example, upon the occurrence of repeated fog patches, the switchover from low-beam lights back to high-beam lights does not take place too rapidly so that the driver is not irritated by the absence of such rapid change.

According to another specific embodiment of the present invention, the method may include the following steps:
reading in image information of an image of the camera;
providing a color indicator value for at least one partial section of the image of the camera, the color indicator value representing a relation between a first parameter and a second parameter, the first parameter representing a value which is obtained by using a first color filter on the image information in the partial section, and the second parameter representing a value which is obtained by not using a color filter or by using a color filter which is different from the first color filter on the image information in the partial section, and/or providing a gradient indicator value which represents a difference in brightness, derivable from the image information, of different, in particular adjacent, image areas of the image of the camera; and
determining an aerosol intensity value by using the color indicator value and/or by using the gradient indicator value in order to determine and provide the intensity of the aerosol in the field of vision of the camera of the vehicle as the aerosol signal.

Image information may be understood to mean a data set which represents the image recorded by the camera, e.g., in the form of color or brightness information of individual pixels of the camera image. A partial section of the image of the camera may be understood to mean an area of the camera image which includes either the entire camera image or only a part of the camera image. A ratio may be understood to mean in general a mathematical relationship between parameters, such as the formation of a comparison, the formation of a quotient, the formation of a difference, or the like, it being unessential what parameter is used in the numerator or in the denominator when forming a quotient or what parameter is used as the minuend or as the subtrahend when forming a difference. A value which may be obtained using a color filter on the image information in the partial section may be understood to mean a value which represents a piece of color information which occurs in the partial section of the image of the camera, a spectral component being filtered out or suppressed by the color filter, however. Thus, the value which is obtained by using a color filter does not represent the actual color information as is seen by the camera in the partial section of the image in question. The gradient indicator value, which may also be referred to as the mean gradient in an area of the image, is, for example, the mean value of the changes in brightness from one pixel to the next. Here, a lower gradient indicator value or mean gradient would be present in a uniform image having little structure (i.e., in the case of small differences between adjacent pixels), thus indicating fog. An aerosol intensity value may be understood to mean a parameter which represents the occurred intensity of the aerosol. Furthermore, it is also conceivable that the value which is obtained by using a color filter on the image information in the partial section is obtained by averaging multiple individual such values.

Such a specific embodiment of the present invention is based on the finding that a reliable recognition of the intensity of the aerosol is possible by comparing at least two values from the partial section of the image of the camera in which at least one value was determined by using a color filter. Here, an aerosol intensity value (in particular as a scalar variable) may be obtained which enables a simple determination of the aerosol which occurred in the visual range ahead of the vehicle, e.g., with the aid of a threshold value comparison. In particular, in such a determination of the intensity of the aerosol the fact is utilized that certain spectral portions of light are reflected from or absorbed by an aerosol droplet or particle to a different degree. By comparing or forming the ratio between two values which refer to the same partial section of the image of the camera, but which contain different spectral portions, it is thus recognizable what spectral portions of light are reflected from the aerosol or an aerosol droplet. Since every aerosol droplet makes only a small contribution to the portion of light reflected toward the camera overall, it is possible to draw the conclusion of how much aerosol or how many aerosol droplets or particles are present in the field of vision of the camera of the vehicle by evaluating the corresponding parameters in the particular partial section. Alternatively or additionally, this specific embodiment of the present invention is based on the finding that the determination of the intensity of the aerosol is advantageously also based on a visual characteristic from the image information which is based on a (brightness) gradient or a difference between (brightness gradients) gradients in different image areas of the image of the camera. The intensity of the aerosol may, for example, be computed from a linkage of a value, which indicates the "red suppression," and the mean gradient. For this purpose, it is not absolutely necessary for the image areas used for the evaluation of the brightness or the gradient to be located in the same partial section from which the parameters for the color intensity value are taken. Due to such an approach, the intensity of the aerosol may be determined quite reliably and only by using simple technical aids such as an optical camera. The provision of other sensors for determining the aerosol may consequently be dispensed with, thus reducing the manufacturing costs of the vehicle.

It is furthermore advantageous when, according to one specific embodiment of the present invention, in the step of determining, the aerosol intensity value is determined using a linear combination, in particular using a weighted linear combination from the color indicator value and the gradient indicator value. Such a specific embodiment of the present invention offers a mathematical operation, which is easy to carry out circuitry-wise or numerically, for determining the intensity of the aerosol; in particular in a weighted linear combination, there is also an additional flexibility as to what degree the two used intensity values should be incorporated in the determination of the aerosol intensity value.

Furthermore, it is also possible in another specific embodiment of the present invention, in the step of determining, to normalize the color indicator value in an area between color indicator limiting values prior to determining the aerosol intensity value and/or to normalize the gradient indicator value in an area between gradient indicator limiting values. In order to carry out a simple determination of the intensity of the aerosol, it is advantageous to normalize one or both values which are used for determining the aerosol intensity value. In this way, a complex conversion for linking otherwise different values to different physical units may be omitted. The color indicator limiting values and/or the gradient indicator limiting values may then be known in advance, for example, as the values detectable maximally by the camera. For example, these limiting values may be established in a laboratory environment.

According to one advantageous specific embodiment of the present invention, in the step of providing, a color indicator value may be provided in which the first or second color filter is a color filter which filters out the red portions in the image information. Such a specific embodiment of the present invention offers the advantage that the evaluation on the basis of the reflected red portions, in particular, is very advantageous, since the reflection of red portions in an aerosol, e.g., fog, varies strongly as a function of the intensity of the aerosol.

It is furthermore advantageous when according to another specific embodiment of the present invention, in the step of determining, an aerosol indicator value is determined which is represented by a scalar. Such a specific embodiment of the present invention offers the advantage that due to a second scalar variable which is technically simple to process, the intensity of the aerosol, in particular fog, may be specified or indicated. Furthermore, a simple parameter setting/applicability is also possible in the case of a technical response to fog which may be carried out by a driver assistance system, since, for example, only one single scalar is compared to a threshold value and multiple values/comparisons are to be considered or carried out.

According to another specific embodiment of the present invention, in the step of determining, the gradient indicator value may be determined by using image information from a center area of the image of the camera, in particular the gradient indicator value being determined by using image information which originates from an image segment of the image which, in the case of the image of the camera being divided into nine not-overlapping image segments, is surrounded by eight of these image segments. Such a specific embodiment of the present invention offers the advantage that in particular in the center area of the image of the camera, a brightness difference or a brightness gradient is pronounced essentially more strongly than in an edge area of the image. The suppression of the red portion in the center of the image (i.e., in the headlight beam) is, for example, pronounced particularly strongly; it does not influence the gradient image. In particular, the edge areas of the image are in most cases not illuminated strongly during a drive with switched on headlights, so that an area of the camera image, in which relatively small differences are still easily recognizable due to strong illumination, should possibly be used for the recognition of even small brightness differences upon the occurrence of the aerosol.

According to another specific embodiment of the present invention, a step of recognizing the presence of an intensity of the aerosol, which is critical for the traffic, in the field of vision of the camera of the vehicle may be provided when the aerosol intensity value is in a predetermined relation with a threshold value, e.g., when the aerosol intensity value is greater than the threshold value. Such a specific embodiment of the present invention offers the advantage of a check, which may be carried out technically very easily, whether an intensity of the aerosol is reached which is critical for the drive of the vehicle. For example, a critical intensity of the aerosol may be reached when the sight range ahead of the vehicle is smaller than a predetermined limiting value. Upon recognition of such an intensity of the aerosol which is critical for the traffic or the drive of the vehicle, a warning may be output to the driver of the vehicle, for example.

BRIEF DESCRIPTION OF THE DRAWINGS

FIG. 3 shows a flow chart of an exemplary embodiment of the present invention as the method.

FIG. 4 shows a flow chart of another exemplary embodiment of the present invention as the method.

DETAILED DESCRIPTION

Figure 1:
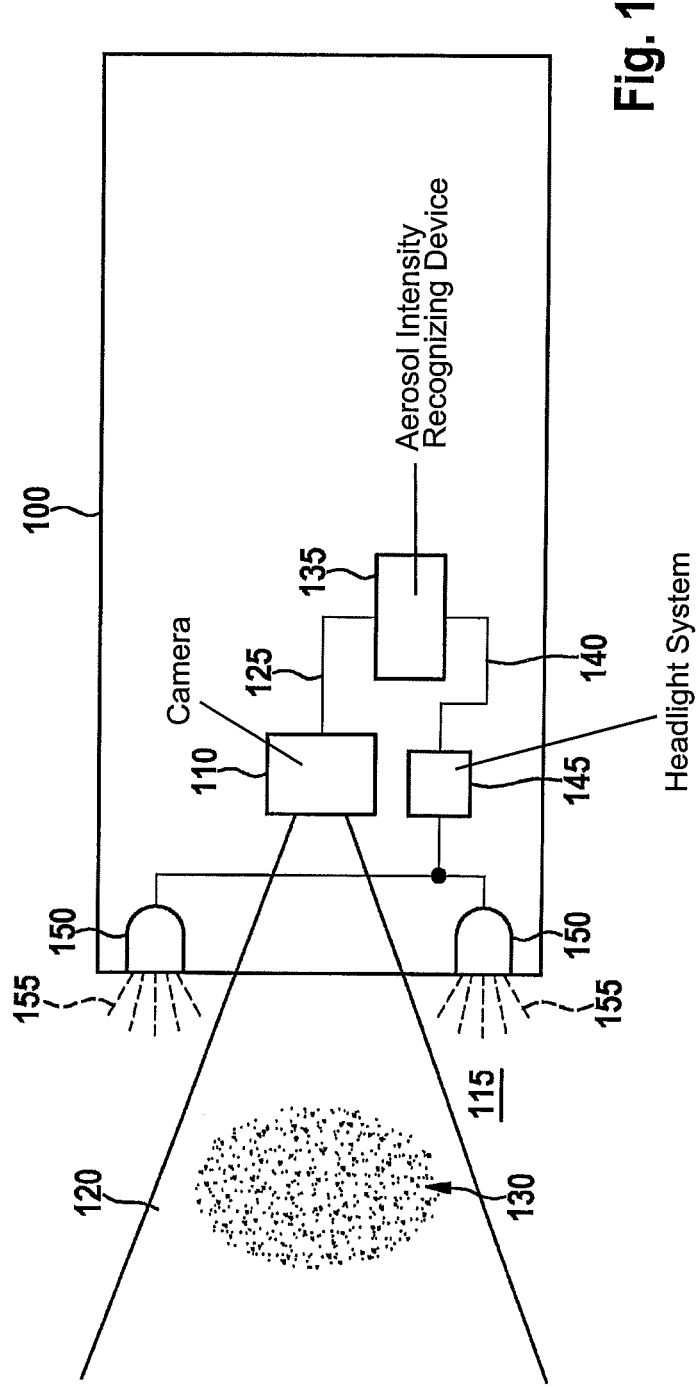
FIG. 1 shows a block diagram of a vehicle in which one exemplary embodiment of the present invention is used.

In the following description of preferred exemplary embodiments of the present invention, the elements which are illustrated in the various figures and appear to be similar are identified with identical or similar reference numerals; a repetitive description of these elements is dispensed with.

FIG. 1 shows a block diagram of a vehicle 100 which contains one exemplary embodiment of the present invention. Vehicle 100 has a camera 110 for detecting vehicle surroundings 115 in a visual range 120 of camera 110 and for providing a corresponding camera image 125. Field of vision 120 may, in particular, be an area ahead of vehicle 100. An aerosol 130, whose intensity is to be recognized, is contained in visual range 120. Camera image 125 is supplied to a device 135 which is designed for recognizing the intensity of the aerosol in the field of vision of the camera of the vehicle. The exact function of device 135 will be explained in greater detail in the following. Now, if it is recognized, for example, that the intensity of aerosol 130 is greater than a predetermined threshold value, an aerosol signal 140 is generated and output to a headlight system 145. As a response to aerosol signal 140, the activation of the light emission is changed by headlight system 145, for example, in such a way that headlights 150 of the vehicle are activated in such a way that light 155 emitted by headlights 150 is directed at a more acute angle toward the roadway on which vehicle 100 is driving. In this way, light 155 emitted by headlights 150 may be prevented from being reflected from aerosol 130, which is in most cases very close to vehicle 100, and from blinding the driver. Headlight control system 145 may also be represented in the form of a system for gliding illumination range control. Here, a deviation of the headlights may be carried out for deflecting the light beam. Modern control systems, however, also have a plurality of movable mirror elements for reflecting a light beam in an arbitrarily variable direction or include a configuration of small movable individual light sources; they may be adjusted (i.e., moved) to implement an illumination of the area ahead of the vehicle in almost any manner. Headlight control system 145 may also be understood to mean such modern systems for gliding illumination range control; in this case, the light emission may be switched over not only in stages (e.g., high-beam and low-beam), but also almost stage-free within a predetermined lighting range.

Figure 2:
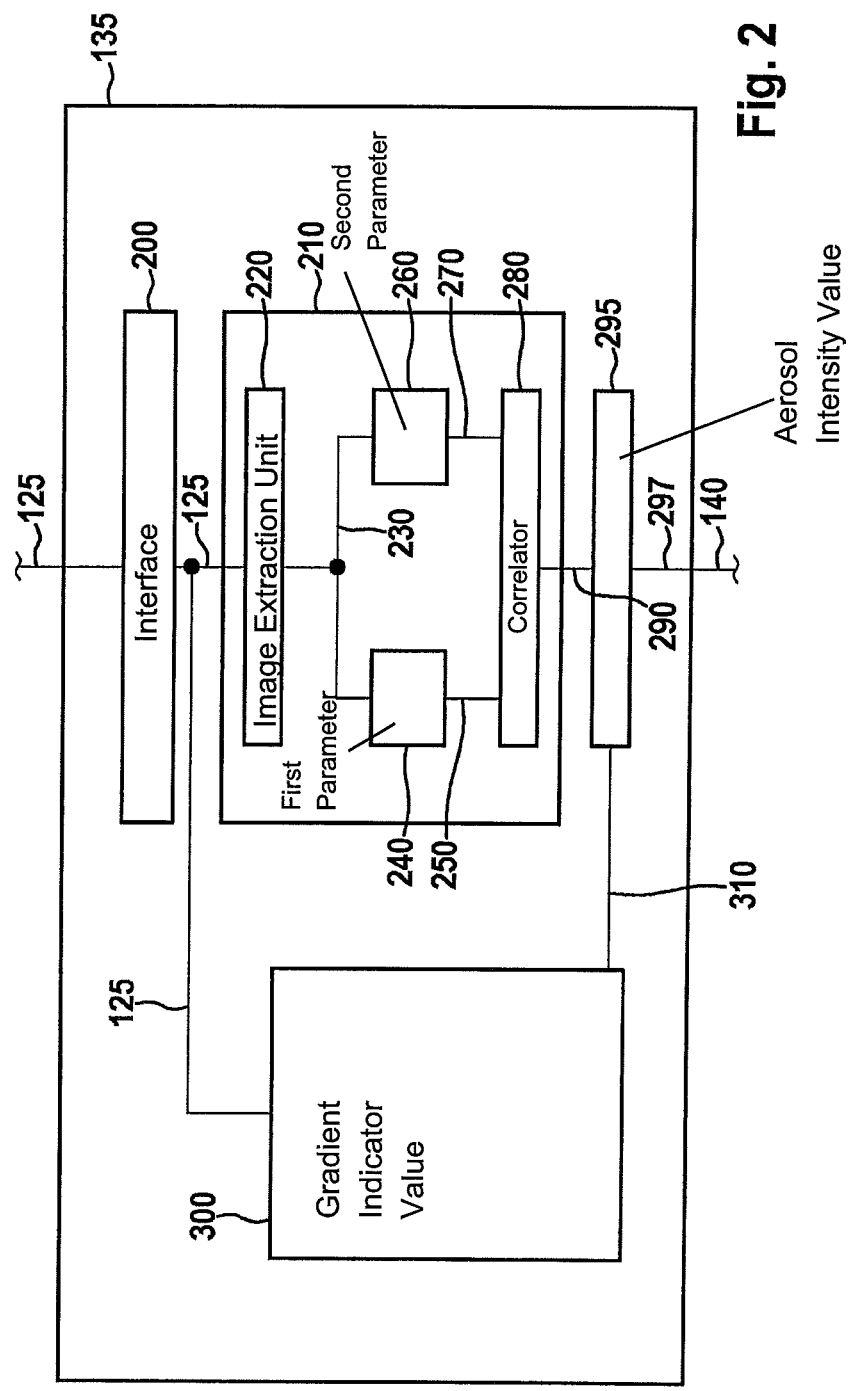
FIG. 2 shows a block diagram of a device for recognizing an intensity of an aerosol in a field of vision of a camera of a vehicle according to one exemplary embodiment of the present invention for a flow chart of an exemplary embodiment of the present invention.

FIG. 2 shows a block diagram of device 135 illustrated schematically in FIG. 1 for recognizing an intensity of an aerosol in a field of vision of a camera of the vehicle. Device 135 includes an interface 200 for reading in of the image information of image 125 of camera 110. This image information is read in, for example, in the form of a digital file which represents the images recorded by camera 110. For the sake of simplicity, the image provided by camera 110 may be read in directly, without the need for carrying out different steps of image processing in advance. Furthermore, device 135 includes a unit 210 for providing a color indicator value. This unit 210 includes a unit 220 in which a partial section 230 of image 125 is extracted which was received by interface 200. A partial section 230 of image 125 may be understood to mean a spatially smaller area of the image of camera 110 which, however, still includes all the information of image 125 in this smaller spatial partial area of image 125. Such a partial section 230 in particular contains a region of camera image 125 which is of particular interest for the drive of the vehicle. For example, partial section 230 may be extracted from a left-hand area of camera image 125 when the vehicle is negotiating a left-hand turn, since this area contains information which is a lot more essential for the safe drive of the vehicle than, for example, the image information in the right-hand area of camera image 125. Selected partial section 230 is subsequently supplied to a unit 240 for ascertaining a first parameter 250 and to a unit 260 for ascertaining a second parameter 270. In unit 240 for ascertaining first parameter 250, partial section 230 of image 125 of the camera is subjected to a first color filtering during which red portions contained in partial section 230 are, for example, suppressed, i.e., filtered out or strongly attenuated. First parameter 250 thus represents a partial section 230 of image 125 in which the image information does not match the image information recorded by camera 110 in this partial section 230 with regard to the red spectral portion of the image. In unit 260 for ascertaining second parameter 270, partial section 230 of image 125 may be subjected to a second color filtering, such as a filtering of blue spectral components, in order to obtain second parameter 270. In unit 260 for ascertaining second parameter 270, it is also possible that a spectral filtering is omitted, so that parameter 270 matches the image information of partial section 230.

First parameter 250 and second parameter 270 are correlated in a unit 280 in order to determine color indicator value 290. Here, a quotient is, for example, formed from first parameter 250 and second parameter 270 in order to obtain color indicator value 290. This color indicator value 290 is, for example, used in a unit 295 to determine aerosol intensity value 297 which represents the intensity of aerosol 130 in a field of vision 120 of camera 110 of vehicle 100. This aerosol intensity value 297 is then, for example, transmitted as an aerosol signal 140 to headlight control system 145.

By evaluating the reflection characteristics of objects in field of vision 120 of camera 110 ahead of the vehicle with regard to different spectral portions, it is easily recognizable whether an aerosol 130 has appeared in field of vision 120 and at what intensity this aerosol 130 is present in field of vision 120 of camera 110. The use of the image of camera 110 thus allows other sensors specifically for recognizing an aerosol 130 appearing ahead of vehicle 100 to be omitted, which, on the one hand, reduces the system complexity of vehicle 100 and, on the other hand, prevents additional costs for the manufacture of vehicle 100 from incurring.

Furthermore, device 135 includes, for example, optional unit 300 which provides a gradient indicator value 310. This unit 300 may compare or correlate a brightness or a gradient (with regard to the brightness) of two different image areas, e.g., two different, in particular adjacent, pixels of image 125 of camera 110, and thus generate and provide gradient indicator value 310. Gradient indicator value 310 may, for example, correspond to a gradient which represents the difference in brightness of the two different image areas. Gradient indicator value 310 is then furthermore used by unit 295 for posting aerosol intensity value 297. When selecting the image areas which are used for determining gradient indicator value 310, it is particularly advantageous when a center area of the image of the camera is used, since in this area the maximum light intensity of light 155 output by the two headlights 150 is to be expected. In the case of maximum light intensity, a brightness difference of the greatest possible precision may also be determined. In particular, it is possible here that when camera image 125 is divided into nine identical, not-overlapping, image segments, the center image segment, i.e., that image segment which is surrounded by eight of these image segments, is used for determining gradient indicator value 310. In order to also avoid errors when determining the gradient indicator value, an averaging of the brightness differences between the individual image areas may be carried out in the observed image segment.

By using the gradient indicator value representing the different brightnesses in different image areas, the recognition of the intensity of the aerosol may be additionally further improved by taking into consideration a second physical parameter which is independent of spectral backscatter characteristics of the aerosol droplets.

FIG. 3 shows a flow chart of an exemplary embodiment of the present invention as a method 330 for recognizing an intensity of an aerosol in a field of vision of a camera of a vehicle. The method includes a step of reading in 340 of image information of an image of the camera. Furthermore, method 330 includes a step of providing 350 a color indicator value for at least one partial section of the image of the camera, the color indicator value representing a relation between a first parameter and a second parameter, the first parameter representing a value which is obtained by using a first color filter on the image information in the partial section, and the second parameter representing a value which is obtained by not using a color filter or by using a color filter which is different from the first color filter on the image information in the partial section, and/or providing a gradient indicator value which represents a difference in brightness, derivable from the image information, of different, in particular adjacent, image areas of the image of the camera. Finally, method 330 includes a step of determining 360 an aerosol intensity value by using the color indicator value and/or by using the gradient indicator value in order to determine and provide the intensity of the aerosol in the field of vision of the camera of the vehicle as the aerosol signal.

In particular, the present invention may be used for measuring the fog intensity in the case of camera-based light control. Additional sensors for recognizing fog may then be dispensed with in the vehicle, thus saving costs. The recognition of aerosol in the vehicle's surroundings, in particular a fog, takes place by video. The determination of the fog density is ascertained by evaluating one or multiple different present fog indicators which are extracted from the image information of the camera image.

It is advantageous that the intensity of the measured aerosol or fog may, in particular, be quantified by a single scalar as the aerosol intensity value.

To determine such an aerosol intensity value,
- color indicator value a is used which in particular represents a suppression of the center red pixels in the area of a region of interest (i.e., in a region of the image of the camera); and
- gradient indicator value b is used which represents a center gradient in the center nonant of the image, a nonant of the image being understood to mean a ninth section of the image of the camera, similarly to a quadrant, which indicates a quarter of a whole.

With the aid of a linear combination of these indicator values, aerosol intensity value c (for example, scalar) is computed as another indicator which quantifies the intensity of the detected fog.

Now, if color indicator value a has a value from value range $a_1$ through $a_2$, it may be displayed or normalized to the value range between 0 and 1 using a conversion formula $$\frac{a-a_1}{a_2-a_1}$$

Accordingly, gradient indicator value b, which also assumes values from value range $b_1$ through $b_2$, for example, may be displayed or normalized to the value range between 0 and 1 using a conversion formula $$\frac{b-b_1}{b_2-b_1}$$

In this way, it is possible to link different values (having different physical units) in a simple manner. Furthermore, by normalizing the indicator values for known limiting values, it is also possible to obtain an aerosol intensity value which lies within a value range between 0 and 1, so that the aerosol intensity value also makes an estimation possible in a simple manner as to how high the relative aerosol concentration is in the field of vision of the camera of the vehicle.

The connection between color indicator value a and gradient indicator value b for determining aerosol intensity value c may be expressed as the following formula:

$$c = \gamma * \frac{a-a_1}{a_2-a_1} * (1-\gamma)\frac{b-b_1}{b_2-b_1}$$

in which a weighting of the indicators may be set by parameter $y=[0 \ldots 1]$ for the purpose of fine tuning of the aerosol intensity recognition.

The fog density indicator or aerosol intensity value c thus computed having the value range between 0 and 1 is thus a measure for the intensity of the detected fog.

In the case of indicators, such as the color indicator value or the gradient indicator value, in which a reduction of the absolute value correlates with a greater fog density, the algebraic sign should be negated accordingly.

Fog density indicator c thus computed having the value range between 0 and 1 is then, for example, compared to a threshold value, whereby a decision may be made regarding the intensity of the fog in order to, for example, turn down the high-beam lights so that the driver is not blinded.

The determination or recognition of the intensity of the aerosol or fog in the vehicle's surroundings may be used for different driver assistance system applications. For example, in an application of the previously described approach in the high beam assist (HMA) of the vehicle, the headlights of the vehicle automatically switch to low-beam, if fog is recognized, in order to avoid blinding the driver due to the reflection of the light of the headlights of the vehicle. To avoid a cyclic switching between high-beam and low-beam lights, a certain time period should elapse after withdrawal of the fog indication and prior to switching over to high-beam lights. This time period may now be selected as a function of the previously detected fog intensity. This means that if the fog was heavy, the waiting period is longer than in the case of lighter fog. In addition to the aerosol or fog intensity, the duration during which the aerosol or the fog is recognized may also be used as a parameter for a prolongation of the waiting period prior to switching from low-beam lights to high-beam lights.

FIG. 4 shows a flow chart of another exemplary embodiment for using the method according to the present invention, the flow chart including the activation of a change in the light emission using the headlights of the vehicle. First, fog is recognized as an aerosol in a step 410. In a subsequent step 420, the low-beam lights are switched on to allow the driver to see better on the roadway. In another subsequent step 430, a light emission parameter, such as a debouncing time t_fog which is supposed to elapse after a change of the recognized intensity of the aerosol prior to the headlight control system changing into another lighting state, e.g., switching from high-beam to low-beam or from low-beam to high-beam, is determined based on the recognized intensity of the aerosol or fog and/or based on the time during which the aerosol or fog is recognized. In this way, a change in the lighting or illumination conditions, which are considered as too fast for the driver and which might irritate the driver and thus cause dangerous driving situations, may be avoided. If fog or aerosol is no longer recognized in a subsequent step 440, the indicated debouncing time is awaited in a next step 450, and in yet another step 460, it is switched back to high-beam lights.

According to another application, the present invention may also be used in an adaptive high beam control (AHC) as the driver assistance system. Similarly to the control of the high-beam and low-beam lights, in the case of the AHC assistance function, it is continuously switched between low-beam and high-beam lights. In this case, it is also possible to shift or select between light stages of low-beam and high-beam, for example, which are selected as a function of the fog or aerosol intensity in such a way that the illumination is optimal for the driver. It is advantageous to select a low light distribution or illumination of the area ahead of the vehicle in the case of high fog intensity, so that the resulting blinding is little, but the illumination is still good. At the same time, the headlights should have the greatest possible opening angle in the case of a low fog intensity, but should not yet switch to high-beam lights, since this results in blinding.

The exemplary embodiments described and shown in the figures have only been selected as examples. Different exemplary embodiments may be combined with each other in their entirety or with regard to their individual characteristics. Also, one exemplary embodiment may be supplemented with characteristics of another exemplary embodiment.

Furthermore, method steps according to the present invention may be repeated and executed in a sequence different from the one described.

If an exemplary embodiment includes an "and/or" link between a first characteristic and a second characteristic, this may be read in such a way that the exemplary embodiment according to one specific embodiment has both the first characteristic and the second characteristic and according to another specific embodiment it has either only the first characteristic or only the second characteristic.

What is claimed is:

1. A method for controlling a headlight system of a vehicle, comprising:
    reading in an aerosol signal representing a recognized intensity of an aerosol in a field of vision of a camera of the vehicle;
    activating a change in a light emission in a lighting area ahead of the vehicle with an aid of the headlight system as a response to the aerosol signal;
    reading in image information of an image of the camera;
    performing at least one of providing a color indicator value for at least one partial section of the image of the camera, and providing a gradient indicator value that represents a difference in brightness, derivable from the image information, of different image areas of the image of the camera; and
    determining an aerosol intensity value by using at least one of the color indicator value and the gradient indicator value to determine and provide the intensity of the aerosol in the field of vision of the camera of the vehicle as the aerosol signal.

2. The method as recited in claim 1, wherein a change in a light emission parameter is one of determined and activated in the step of activating as a function of a time of presence of the aerosol.

3. The method as recited in claim 2, wherein the time of presence corresponds to a presence of a predetermined minimum intensity of the aerosol.

4. The method as recited in claim 1, wherein a change in a light distribution is activated in the step of activating in the case of an active light emission control as a function of the recognized intensity of the aerosol.

5. The method as recited in claim 1, wherein a change in a light emission parameter for a light output by the headlight system of the vehicle is activated between different lighting states in the step of activating.

6. A method for controlling a headlight system of a vehicle, comprising:
    reading in an aerosol signal representing a recognized intensity of an aerosol in a field of vision of a camera of the vehicle;
    activating a change in a light emission in a lighting area ahead of the vehicle with an aid of the headlight system as a response to the aerosol signal; and
    reading in image information of an image of the camera;
    performing at least one of:
        providing a color indicator value for at least one partial section of the image of the camera, wherein:
            the color indicator value represents a relation between a first parameter and a second parameter,
            the first parameter represents a value obtained by using a first color filter on the image information in the partial section, and
            the second parameter represents a value which is obtained one of by not using the first color filter and by using a second color filter that is different from the first color filter on the image information in the partial section, and
        providing a gradient indicator value that represents a difference in brightness, derivable from the image information, of different image areas of the image of the camera; and
    determining an aerosol intensity value by using at least one of the color indicator value and the gradient indicator value in order to determine and provide the intensity of the aerosol in the field of vision of the camera of the vehicle as the aerosol signal.

7. The method as recited in claim 6, wherein the difference in brightness is of adjacent image areas of the image of the camera.

8. The method as recited in claim 7, wherein the first parameter represents a value obtained by using a first color filter on the image information in the partial section.

9. The method as recited in claim 7, wherein the second parameter represents a value which is obtained one of by not using the first color filter and by using a second color filter that is different from the first color filter on the image information in the partial section.

10. The method as recited in claim 6, wherein in the step of determining, the aerosol intensity value is determined using a linear combination.

11. The method as recited in claim 10, wherein the linear combination includes a weighted linear combination from the color indicator value and the gradient indicator value.

12. The method as recited in claim 6, wherein in the step of determining, at least one of:
    the color indicator value in an area between color indicator limiting values is normalized, and
    the gradient indicator value in an area between gradient indicator limiting values is normalized prior to determining the aerosol intensity value.

13. The method as recited in claim 6, wherein in the step of providing the color indicator value, a color indicator value is provided in which one of the first color filter and the second color filter is a color filter which filters out red portions in the image information.

14. The method as recited in claim 6, wherein in the step of determining, an aerosol indicator value is determined and is represented by a scalar.

15. The method as recited in claim 6, wherein in the step of determining, the gradient indicator value is determined by using image information from a center area of the image of the camera.

16. The method as recited in claim 6, wherein in the step of determining, the gradient indicator value is determined by using image information which originates from an image segment of the image which, in the case of the image of the camera being divided into nine not-overlapping image segments, is surrounded by eight of the partial sections.

17. The method as recited in claim 6, further comprising:
    recognizing a presence of an intensity of the aerosol, which is critical for traffic, in the field of vision of the camera of the vehicle when the aerosol intensity value is in a predetermined relation to a threshold value.

18. The method as recited in claim 6, wherein the color indicator value represents a relation between a first parameter and a second parameter.

19. A device for controlling a headlight system of a vehicle, the device comprising:
    an interface for reading in an aerosol signal that represents a recognized intensity of an aerosol in a field of vision of a camera of the vehicle; and a unit for activating a change in a light emission in a lighting area ahead of the vehicle with an aid of the headlight system as a response to the aerosol signal; and a reading arrangement for reading in image information of an image of the camera;

a providing arrangement for at least one of providing a color indicator value for at least one partial section of the image of the camera, and providing a gradient indicator value that represents a difference in brightness, derivable from the image information, of different image areas of the image of the camera; and a determining arrangement to determine an aerosol intensity value by using at least one of the color indicator value and the gradient indicator value to determine and provide the intensity of the aerosol in the field of vision of the camera of the vehicle as the aerosol signal.

20. A non-transitory computer readable medium having a computer program, which is executable by a processor, comprising:

a program code arrangement having program code for controlling a headlight system of a vehicle by performing the following:

reading in an aerosol signal representing a recognized intensity of an aerosol in a field of vision of a camera of the vehicle;

activating a change in a light emission in a lighting area ahead of the vehicle with an aid of the headlight system as a response to the aerosol signal;

reading in image information of an image of the camera;

performing at least one of providing a color indicator value for at least one partial section of the image of the camera, and providing a gradient indicator value that represents a difference in brightness, derivable from the image information, of different image areas of the image of the camera; and determining an aerosol intensity value by using at least one of the color indicator value and the gradient indicator value to determine and provide the intensity of the aerosol in the field of vision of the camera of the vehicle as the aerosol signal.

* * * * *